(12) United States Patent
Terano et al.

(10) Patent No.: US 8,990,114 B2
(45) Date of Patent: Mar. 24, 2015

(54) ELECTRIC POWER INTERCHANGE SYSTEM

(75) Inventors: Masaaki Terano, Nara (JP); Yoshitaka Ichii, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/508,122

(22) PCT Filed: Nov. 2, 2010

(86) PCT No.: PCT/IB2010/002781
§ 371 (c)(1),
(2), (4) Date: May 25, 2012

(87) PCT Pub. No.: WO2011/055208
PCT Pub. Date: May 12, 2011

(65) Prior Publication Data
US 2012/0233060 A1     Sep. 13, 2012

(30) Foreign Application Priority Data
Nov. 6, 2009   (JP) ................................ 2009-255407

(51) Int. Cl.
*G06Q 40/00*     (2012.01)
*H02J 3/00*     (2006.01)
*G06Q 30/06*     (2012.01)
*G06Q 50/06*     (2012.01)

(52) U.S. Cl.
CPC ................ *H02J 3/008* (2013.01); *G06Q 30/06* (2013.01); *G06Q 50/06* (2013.01); *Y04S 50/10* (2013.01)
USPC ................................ 705/37; 705/412; 307/24

(58) Field of Classification Search
None
See application file for complete search history.

(56) References Cited

U.S. PATENT DOCUMENTS

| | | | |
|---|---|---|---|
| 3,244,898 A * | 4/1966 | Hickox | 290/2 |
| 4,078,388 A * | 3/1978 | Atencio | 405/78 |
| 6,262,569 B1 * | 7/2001 | Carr et al. | 324/74 |
| 6,337,561 B1 * | 1/2002 | Sudou et al. | 322/19 |
| 6,401,014 B1 * | 6/2002 | Hill et al. | 701/3 |

(Continued)

FOREIGN PATENT DOCUMENTS

| JP | H11-332108 | 11/1999 |
|---|---|---|
| JP | 2003-32887 | 1/2003 |

(Continued)

OTHER PUBLICATIONS

International Search Report for corresponding International Application No. PCT/IB2010/002781 mailed Mar. 15, 2011.

(Continued)

*Primary Examiner* — Gregory Johnson
(74) *Attorney, Agent, or Firm* — Renner, Otto, Boisselle & Sklar, LLP

(57) ABSTRACT

In a power interchange system, a power generated by a power generation device is interchanged between power consumers which receive an electric power supply from a power supply system. The amount of electric power sold by a power consumer is defined as an amount of selling power, and the amount of electric power that the power consumer demands from another electricity consumer is defined as an amount of purchasing power. Power interchange groups are formed, in which power consumers interchanges an electric power thereamong, and each power consumer is provided with a power control device which manages the electric power from the power generation device.

10 Claims, 8 Drawing Sheets

(56) References Cited

U.S. PATENT DOCUMENTS

| | | | |
|---|---|---|---|
| 7,249,027 B1* | 7/2007 | Ausubel | 705/37 |
| 8,415,827 B2* | 4/2013 | Nagata | 307/29 |
| 2001/0053992 A1* | 12/2001 | Eto et al. | 705/7 |
| 2002/0143438 A1* | 10/2002 | Akiyama et al. | 700/286 |
| 2003/0028469 A1* | 2/2003 | Bergman et al. | 705/37 |
| 2003/0036820 A1* | 2/2003 | Yellepeddy et al. | 700/291 |
| 2003/0074244 A1* | 4/2003 | Braxton | 705/7 |
| 2003/0078797 A1* | 4/2003 | Kanbara et al. | 705/1 |
| 2004/0010453 A1* | 1/2004 | Aubert | 705/26 |
| 2004/0078153 A1* | 4/2004 | Bartone et al. | 702/57 |
| 2004/0254899 A1* | 12/2004 | Abe et al. | 705/412 |
| 2005/0115241 A1* | 6/2005 | Shimada et al. | 60/698 |
| 2005/0209951 A1* | 9/2005 | Aron et al. | 705/37 |
| 2005/0234600 A1* | 10/2005 | Boucher et al. | 700/286 |
| 2006/0025260 A1* | 2/2006 | Klemen et al. | 475/5 |
| 2006/0259332 A1* | 11/2006 | Brown | 705/3 |
| 2006/0271214 A1* | 11/2006 | Brown | 700/90 |
| 2007/0136120 A1* | 6/2007 | Watanabe et al. | 705/8 |
| 2008/0040479 A1* | 2/2008 | Bridge et al. | 709/224 |
| 2008/0068996 A1* | 3/2008 | Clave et al. | 370/230.1 |
| 2008/0177678 A1* | 7/2008 | Di Martini et al. | 705/412 |
| 2008/0304595 A1* | 12/2008 | Haug et al. | 375/316 |
| 2009/0063228 A1* | 3/2009 | Forbes, Jr. | 705/7 |
| 2009/0222320 A1* | 9/2009 | Arfin et al. | 705/10 |
| 2010/0001585 A1* | 1/2010 | Nagata | 307/24 |
| 2010/0071394 A1* | 3/2010 | Alden | 62/235.1 |
| 2010/0107173 A1* | 4/2010 | Chassin | 718/104 |
| 2010/0217651 A1* | 8/2010 | Crabtree et al. | 705/10 |
| 2010/0228601 A1* | 9/2010 | Vaswani et al. | 705/10 |
| 2010/0235209 A1* | 9/2010 | Vaswani et al. | 705/7 |
| 2010/0250590 A1* | 9/2010 | Galvin | 707/770 |
| 2010/0293045 A1* | 11/2010 | Burns et al. | 705/14.11 |
| 2011/0029461 A1* | 2/2011 | Hardin, Jr. | 705/412 |
| 2011/0040666 A1* | 2/2011 | Crabtree et al. | 705/37 |
| 2011/0055036 A1* | 3/2011 | Helfan | 705/26.1 |
| 2012/0065792 A1* | 3/2012 | Yonezawa et al. | 700/291 |
| 2012/0173035 A1* | 7/2012 | Abe | 700/297 |
| 2012/0221491 A1* | 8/2012 | Koshin et al. | 705/412 |
| 2012/0233060 A1* | 9/2012 | Terano et al. | 705/37 |
| 2012/0286574 A1* | 11/2012 | Sawada et al. | 307/23 |
| 2012/0323635 A1* | 12/2012 | Arfin et al. | 705/7.31 |
| 2013/0043725 A1* | 2/2013 | Birkelund | 307/24 |

FOREIGN PATENT DOCUMENTS

| | | |
|---|---|---|
| JP | 2003-281231 | 10/2003 |
| JP | 2003-324850 | 11/2003 |
| JP | 2004-15882 | 1/2004 |
| JP | 2004-21444 | 1/2004 |
| JP | 2005-218193 | 8/2005 |
| JP | 2006-288162 | 10/2006 |
| JP | 2007-128785 | 5/2007 |
| JP | 2009-20674 | 1/2009 |
| WO | 2004/073136 | 8/2004 |
| WO | WO 2004073136 A1 * | 8/2004 |
| WO | WO 2011012134 A1 * | 2/2011 |

OTHER PUBLICATIONS

Form PCT/ISA/237 for corresponding International Application No. PCT/IB2010/002781 dated Mar. 15, 2011.

Japanese Office Action in corresponding Japanese Application No. 2009-255407 dated Jan. 28, 2014.

* cited by examiner

FIG. 3

[RELATIONSHIPS BETWEEN AMOUNTS OF TRADED POWER AND DISTRIBUTED POWER OF POWER CONSUMERS]

| POWER CONSUMER | AMOUNT OF DISCHARGED POWER | AMOUNT OF POWER TO BE SOLD | AMOUNT OF TRADING POWER | RELATIONSHIP IN TRADE | AMOUNT OF POWER DISTRIBUTION |
|---|---|---|---|---|---|
| A | 200 | 100 | SELLING 80 | ↱↓ | |
| B | 20 | 0 | PURCHASING 120 | ↓ | 48 |
| C | 10 | 0 | PURCHASING 80 | | 32 |

ELECTRIC POWER INTERCHANGE SYSTEM

FIELD OF THE INVENTION

The present invention relates to a power interchange system for interchanging powers generated from power consuming dwellings among the dwellings which are supplied with the powers from a power supply system.

BACKGROUND OF THE INVENTION

In recent years, there is an increasing number of power consuming dwellings which generate an electric power by themselves with solar cells or fuel cells. However, there is a case where an amount of a power produced through the self-power generation exceeds an amount of a consumed electric power. In this case, a surplus power is discarded. Therefore, a technique for interchanging the surplus power between dwellings is suggested (e.g., Japanese patent application publication No. 2006-288162 (JP2006-288162A).

SUMMARY OF THE INVENTION

In JP2006-288162A, a management device is provided which collectively manages amounts of powers to be sold by respective power consuming dwellings and amounts of powers required by the respective dwellings to enable the dwellings to interchange powers amongst themselves. Meanwhile, there is a request for simply exchanging powers, which are generated from general power consuming dwellings, among the dwellings without the intervention of such a management device.

In view of the above, the present invention provides a power interchange system which enables a power to be interchanged between power consuming dwellings without the intervention of a collective management device.

In accordance with an aspect of the present invention, there is provided a power interchange system for enabling a plurality of power consumers, which are supplied with a power from a power supply system, to interchange a power generated by their power generation devices among themselves, wherein each of the power consumers comprises a power control device which manages the power of the power generation device based on an amount of selling power sold by each of the power consumers and an amount of power purchased by each of the power consumers.

The power control device transmits and receives power selling amount information indicating the amount of the selling power and power purchasing amount information indicating the amount of the purchasing power to and from the other power consumers, establishes a power trade between the power consumers based on the power selling amount information and the power purchasing amount information and issues an instruction to discharge a power corresponding to the amount of the selling power into the power supply system based on a power trading condition generated between a power consumer on a selling side and a power consumer on a purchasing side.

In this configuration, the power consumers share the power selling amount information and the power purchasing amount information within the power interchanging group and also trade power amongst themselves by using the control units. Since the power trades are executed by the control units provided in the respective power consumers, a power can be interchanged between the power consumers without the intervention of a management device which collectively manages the power consumers.

The power control device may have a function of setting a power trading condition between specific power consumers in advance, and executes a power trade between the specific power consumers based on the set power trading condition.

With this configuration, when there is power to be sold, a power trade can be executed based on the preset power trading condition without an agreement being entered into between the power consumer which sells the power and the power consumers which purchase power, so that the response to a demand for power can be made rapidly.

Each of the power consumers may further includes a battery for storing the power generated by the power generation device, and calculates the amount of the selling power based on an amount of a power stored in the battery above a threshold value.

With this configuration, the power generated by the power generation device is stored in the battery first to be sold, and the battery functions as a buffer, so that power can be stably interchanged with the other power consumers.

The amount of the selling power may be a difference between an amount of the power generated by the power generation device and an amount of a power consumed by the corresponding power consumer when the amount of the generated power is larger than the amount of the consumed power.

With this configuration, when there is a surplus power, and the surplus power is traded with one or more of the power consumers, the amount of power required by the corresponding power consumer is ensured first, and then the remaining power can be interchanged with the other power consumers.

An electricity meter for measuring an amount of a power flowing through a base portion is preferably provided in the base portion of the power supply system, the base portion being provided at upstream of a power supply junction branching into the individual power consumers, and the power trade by the power control device is restrained when a reverse flow of a current is detected by the electricity meter.

When a reverse flow of a current occurs in the base portion at upstream of the power lines which supplies power to the respective power consumers, a power is supplied to the outside beyond the range of the power interchange among the overall power interchanging group. Accordingly, with the above configuration, when the reverse flow of the current is detected by the electricity meter, the power trade of the control units is restrained, thereby being able to suppress the reverse flow of the current.

BRIEF DESCRIPTION OF THE DRAWINGS

The objects and features of the present invention will become apparent from the following description of preferred embodiments given in conjunction with the accompanying drawings, in which:

FIG. 3 is a table showing the relationships between amounts of traded powers and distributed powers of power consumers in accordance with the embodiment of the present invention;

FIGS. 7A to 7D are timing charts showing variations in charge level of each power consumer in accordance with the embodiment of the present invention, wherein FIG. 7A shows variations in charge level on a power selling side before the execution of a power trade, FIG. 7B shows variations in charge level on a power purchasing side before the execution of a power, FIG. 7C shows variations in charge level on the power selling side when a power trade is executed, and FIG. 7D shows variations in charge level on the power purchasing side when a power trade is executed.

DETAILED DESCRIPTION OF THE EMBODIMENTS

Figure 1:
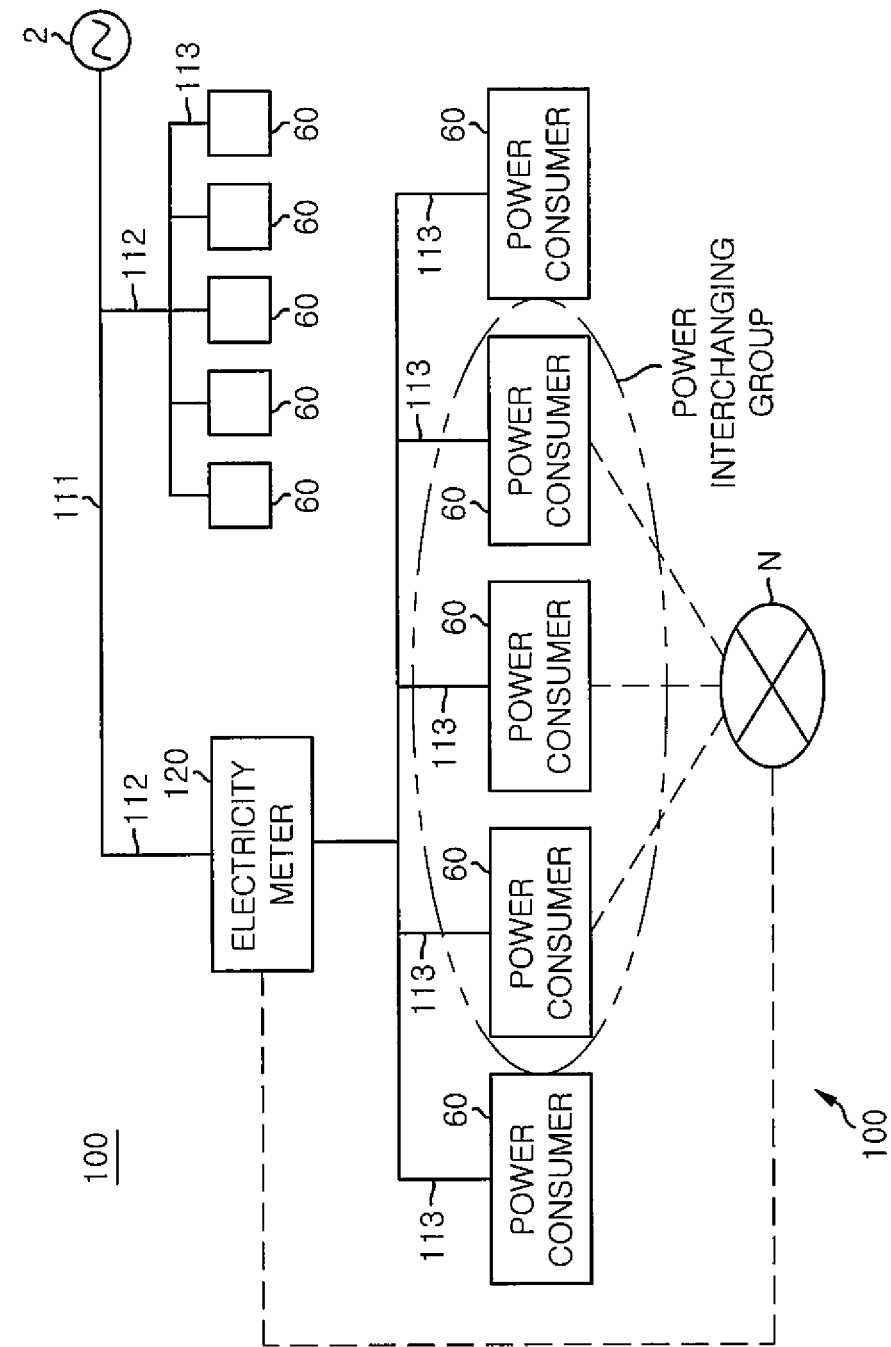
FIG. 1 is a block diagram showing a schematic configuration of a power trading system in accordance with an embodiment of the present invention.

Hereinafter, embodiments of the present invention will be described with reference to the accompanying drawings which form a part hereof. Throughout the drawings, like reference numerals will be given to like parts, and redundant description thereof will be omitted.

Embodiments of the present invention will be descried with reference to FIGS. 1 to 7D.

As shown in FIG. 1, a power supply system 110 includes a commercial AC power source 2, a main power line 111 for transmitting an electric power from the commercial AC power source 2, and a subsidiary power line 112 branched off from the main power line 111. Power lines 113 are deployed from the subsidiary power line 112 to a plurality of power consumers 60 to supply an AC power to the individual power consumers 60.

The power consumers 60 who are supplied with a power from the subsidiary power line 112 form a power interchanging group G within which an electric power is traded. The power consumers 60 of the power interchanging group G trade a power with each other. The condition for the members of the power interchanging group G is that they are supplied with a power from the same subsidiary power line 112. Since it is difficult to interchange a power between a power consumer 60 of one subsidiary power line 112 and a power consumer 60 of another subsidiary power line 112 due to a long distance therebetween, the above condition is established.

The individual power consumers 60 of the power interchanging group G are connected to a network N such as the Internet, and power information of the individual power consumers 60 is shared through the network N. Therefore, each power consumer 60 can view the power information of the other power consumers 60 in the power interchanging group G.

An electricity meter 120 for measuring an amount of a power flowing through a base portion and determining a direction of a current flowing therethrough is provided in the base portion of the power supply system 110 which is at the upstream of a junction portion branching into the individual power consumers 60. The electricity meter 120 determines whether there is a reverse flow of the current based on the direction of current. The electricity meter 120 is connected to the network N to sends information on the amount of the power flowing through the base portion and information on the reverse flow of the current to the individual power consumers 60.

Figure 2:
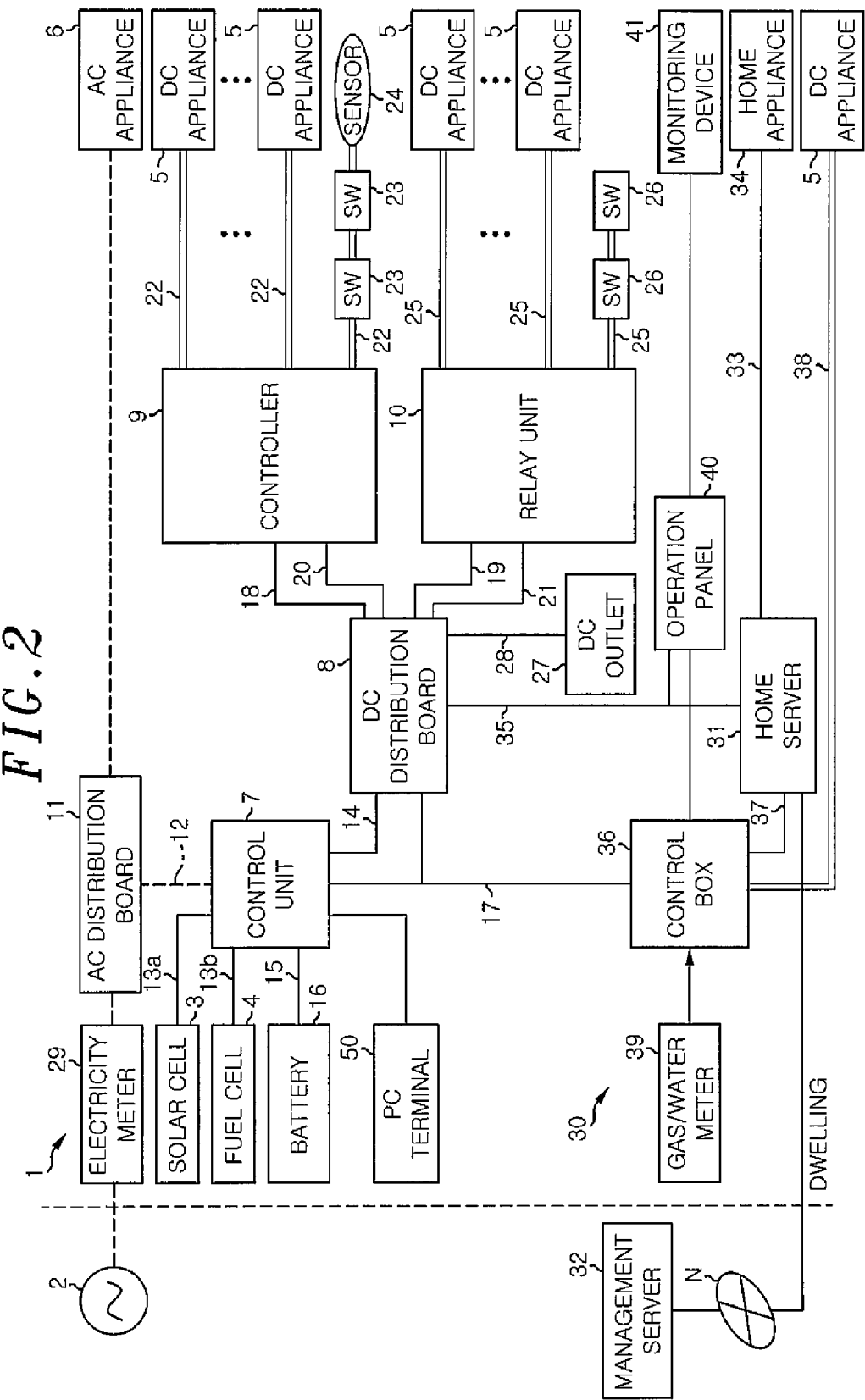
FIG. 2 is a block diagram showing the schematic configuration of a power supply system of a power consumer in accordance with the embodiment of the present invention.

The power supply system 1 of each power consumer will be described with reference to FIG. 2.

The power supply system 1 for supplying an electric power to a variety of types of household appliances (a lighting device, an air conditioner, a household electric appliance, audio and video equipment and the like) is provided in a dwelling of each power consumer.

The power supply system 1 supplies the power from the commercial AC power source 2 for household use as well as a power by a solar cell 3 which generates the power by using solar light and a power by a fuel cell 4 which generates the power by using fuel to a variety of types of appliances. The power supply system 1 supplies the power not only to DC appliances 5 which operate with a DC power inputted from a DC power supply but also an AC appliance 6 which operates with an AC power inputted from the commercial AC power source 2.

The power supply system 1 is provided with a control unit 7 and a DC distribution board 8 (in which a DC breaker is arranged). The power supply system 1 is further provided with a controller 9 and a relay unit 10 for controlling operations of the DC appliances 5 of the dwelling.

An AC distribution board 11 for dividing an AC power is connected to the control unit 7 through an AC power line 12. The control unit 7 is connected to the commercial AC power source 2 via the AC distribution board 11, is connected to the solar cell 3 through a DC power line 13a, and is connected to the fuel cell 4 through a DC power line 13b. The control unit 7 receives an AC power from the AC distribution board 11 and also a DC power from the solar cell 3 and the fuel cell 4 and converts the power into a predetermined DC power which is used as an appliance power. The control unit 7 outputs the resultant DC power to the DC distribution board 8 via a DC power line 14 and to a battery 16 via a DC power line 15. The control unit 7 receives an AC power and also converts the DC power of the solar cell 3 or that of the battery 16 into an AC power to supply it to the AC distribution board 11. In addition, the control unit 7 exchanges data with the DC distribution board 8 via a signal line 17.

The DC distribution board 8 is a kind of breaker for the DC power. The DC distribution board 8 branches the DC power inputted from the control unit 7 and outputs the resultant DC powers to the controller 9 via a DC power line 18 and/or to the relay unit 10 via a DC power line 19. Further, the DC distribution board 8 exchanges data with the controller 9 via signal line 20 or with the relay unit 10 via a signal line 21.

The plurality of DC appliances 5 is connected to the controller 9. These DC appliances 5 are connected to the controller 9 via DC supply lines 22, each of which is capable of carrying both DC power and data. Each of the DC supply lines 22 transmits both power and data to a corresponding DC appliance 5 via a pair of lines using, e.g., Power Line Communication (PLC) in which communication signals which transmits data via a high-frequency transmission wave is superimposed on the DC voltage to be used as the power of the DC appliances 5. The controller 9 acquires the DC power for the DC appliances 5 via the DC power line 18, and detects the operating control status of the DC appliances 5 based on operation instructions acquired from the DC distribution board 8 via the signal line 20. Then, the controller 9 outputs a DC voltage and operation instructions to a designated DC appliance 5 via the DC supply lines 22 to control the operations of the DC appliance 5.

Switches 23 which are manipulated when switching the operations of the DC appliance 5 are connected to the controller 9 via the DC supply line 22. Further, a sensor 24 for detecting radio waves transmitted from, e.g., an infrared remote controller, is connected to the controller 9 via the DC supply line 22. Accordingly, the DC appliances 5 are controlled by communication signals transmitted over the DC supply lines 22 in response to not only an operation instruction from the DC distribution board 8 but also the manipulation of the switches 23 and the detection of the sensor 24.

The plurality of DC appliances 5 are connected to the relay unit 10 via respective DC power lines 25. The relay unit 10 obtains the DC power for the DC appliances 5 via the DC power line 19, and determines which of the DC appliances 5 is to be operated based on an operation instruction acquired from the DC distribution board 8 via the signal line 21. Further, the relay unit 10 controls the operations of the DC appliance 5 determined to be operated in such a way to have relays built therein to turn on and off the supply of powers to the DC power lines 25. Furthermore, a plurality of switches 26 for manually operating the DC appliances 5 are connected to the relay unit 10, and thus, the DC appliances 5 are controlled by manipulating the switches 26 to have the relays to allow or cut of power supply to the DC power lines 25.

A DC outlet 27 which is mounted in the dwelling in a form of, e.g., a wall socket or a floor socket, is connected to the DC distribution board 8 via a DC power line 28. When a plug (not shown) of the DC appliance 5 is inserted into the DC outlet 27, it is possible to directly supply the DC power to the DC appliance 5.

Furthermore, an electricity meter 29 which is capable of remotely measuring, e.g., an amount of the consumed power from the commercial AC power source 2 is connected to the AC distribution board 11. The electricity meter 29 has not only a function of remotely measuring the amount of the consumed power from the commercial AC power source 2 but also, e.g., a power line communications function or a wireless communications function. The electricity meter 29 transmits measurement results to an electric power company or the like through power line communications or wireless communications.

The power supply system 1 is provided with a network system 30 that enables various kinds of the home appliances to be controlled through network communications. The network system 30 includes a home server 31 that functions as a controller thereof. The home server 31 is connected to an external home management server 32 via a network N such as the Internet and is also connected to a home appliance 34 through a signal line 33. The home server 31 is operated by a DC power supplied from the DC distribution board 8 through a DC power line 35.

A control box 36 for managing the operational control of various kinds of home appliances through network communications is connected to the home server 31 through a signal line 37. The control box 36 is connected to the control unit 7 and the DC distribution board 8 through the signal line 17. The control box 36 directly controls the DC appliances 5 through a DC supply line 38. A gas/water meter 39 capable of remotely measuring, e.g., the amounts of gas and tap water used, is connected to the control box 36 which is connected to an operation panel 40 of the network system 30. A monitoring device 41 including, e.g., a door phone outdoor unit, a sensor or a camera is connected to the operation panel 40.

When operation instructions to operate the various kinds of home appliances are inputted through the network N, the home server 31 notifies the control box 36 of the operation instructions and operates the control box 36 so that the home appliances can be operated based on the operation instructions. Moreover, the home server 31 can provide various kinds of information obtained from the gas/water meter 39 to the management server 32 through the network N. When an abnormality detected by the monitoring device 41 is notified to the home server 31 through the operation panel 40, the home server 31 provides the information on the detected abnormality to the management server 32 through the network N.

Here, the control unit 7 will be described in detail.

The control unit 7 manages an amount of commercial AC power MC supplied from the AC power line 12, an amount of photovoltaic power MA generated by the solar cell 3, the amount of fuel power MB generated by the fuel cell 4, an amount of charged power MG of the battery 16 and a charge level CL of the power in the battery 16. The control unit 7 changes a power supply source for power supply to the AC appliance 6 or the DC appliances 5 based on the amount of the commercial AC power MC, the amount of the photovoltaic power MA, the amount of the fuel power MB, and the charge level CL. A PC terminal 50 is connected with the control unit 7. Further, the amount of the commercial AC power MC, the amount of the photovoltaic power MA, the amount of the fuel power MB, and the charge level CL of the batter 16 are displayed on the PC terminal 50.

The control unit 7 performs a power control as follows.

When the amount of consumed power MD consumed by the DC appliances 5 and the AC appliance 6 is smaller than the amount of photovoltaic power MA generated by the solar cell 3, and thus there is a surplus amount of the photovoltaic power MA, the control unit 7 accumulates the surplus amount of the photovoltaic power MA in the battery 16. The charge level CL of the battery 16 is managed by the control unit 7. When the charge level CL of the battery 16 reaches a full charge level CLA, the control unit 7 stops charging. Further, when the amount of power generated by the solar cell 3 is smaller than the amount of consumed power MD, the control unit 7 allows discharge from the battery 16 to supply the discharged power to the AC appliance 6 or DC appliances 5. When the charge level CL reaches the first threshold value CLB of the battery 16, the control unit 7 stops discharge. The first threshold value CLB is set for the storage battery 16 to prepare an electric power in case of emergency, such as a blackout.

Furthermore, when the amount of consumed power MD consumed by the AC appliance 6 exceeds a value set as a maximum amount of power consumed, the control unit 7 cuts off the supply of the AC power. When the amount of power MD consumed by the DC appliances 5 exceeds a value set as a maximum amount of power consumed, the control unit 7 cuts off the supply of the DC power.

Further, the control unit 7 manages the amounts of consumed power MD consumed by the AC appliance 6 and the DC appliances 5, the amount of commercial AC power MC supplied from the commercial AC power source 2, the amounts of power generated by the fuel cells 4 and the solar cells 3, and the charge level CL of the battery 16. Furthermore, the control unit 7 calculates the amount of power which can be sold (hereinafter referred to as "the amount of selling power") based on the above amounts of powers, or calculates the amount of power which needs to be purchased (hereinafter referred to as "the amount of purchasing power). In addition, the control unit 7 transmits information on the amount of selling power (hereinafter, referred to as "selling power amount information) and information on the amount of purchasing power (hereinafter, referred to as "purchasing power amount information) to the other power consumers 60 in the power interchanging group G via the network N to which PC terminals 50 are connected and receives such information from the other power consumers 60.

An example of power trade control which is performed by the control unit 7 will now be described with reference to FIG. 3. Here, the amounts of power traded by power consumers A, B and C will be described. The power consumer A does not completely consume a generated power per day and thus has a surplus amount of the power, whereas the power consumers B and C completely consume the generated power per day and thus are supplied with powers from the commercial AC power source 2. The values shown in the drawing are indices representative of the amounts of powers. An average value of the amounts of charged powers in the power consumers 60 per day in a specific time period is set to 100 for the indices. In the power trade control, actual amounts of powers may be used instead or the indices.

Table shown in FIG. 3 shows the amount of charged power MG, an amount of available power for selling and an amount of trading power of each power consumer 60, relationships of trading between the power consumers, and an distribution amount of a power sold by the power consumer A at a predetermined time. These pieces of information are all shared by the power consumers 60 in the power interchanging group G.

The amount of charged power MG is calculated based on the charge level CL of the battery 16. The amount of available power for selling is obtained as an amount of power which is accumulated above the second threshold value CLC at a predetermined time when the charge level CL exceeds the second threshold value CLC. The amount of purchasing power is obtained as an amount of power corresponding to a shortage to reach the second threshold value CLC at a predetermined time when the charge level CL is lower than the second threshold value CLC.

The second threshold value CLC is set as a reference value which is used to determine to sell or purchase a power and is set higher than the first threshold value CLB. For example, the second threshold value CLC is set base on the amounts of consumed power MD by the AC appliance 6 and the DC appliances 5 during the night. These settings allow a power discharged from the battery 16 to be supplied during the night at which the solar cell 3 generates no power.

When there are a seller of power and two or more purchasers of power at the corresponding time, the selling power is distributed in the ratio between the amounts of purchasing powers required by the purchasers. In the drawing, the power consumer A wants to sell the amount of power of 80, the power consumer B wants to purchase the amount of power of 120, and the power consumer C wants to purchase the amount of power of 80.

When such power trades enter into agreements, the control unit 7 of the power consumer A, that is, the power seller, issues an instruction to discharge a power from the battery 16 via the power lines 113. At the same time, the control units 7 of the power consumers B and C, i.e., power purchasers, receive the power via the power line 113 and start charging.

During the discharging process, the amount of power which flowing through the base portion of the power supply system 110, the base portion being provided at the upstream of the junction portion branching into the individual power consumers 60, is measured by the electricity meter 120. When a reverse flow of a current occurs during the discharging process, it is assumed that the power flows into a system other than the power supply system 110 to which the power interchanging group G is connected and there is a worry about the serious imbalance in the electric power within the system. Therefore, the corresponding trade is invalidated and the discharging and charging via the power lines 113 are stopped.

Further, information on the reverse flow of the current is transmitted to the control units 7 of the respective power consumers 60 via the network N.

Figure 4:
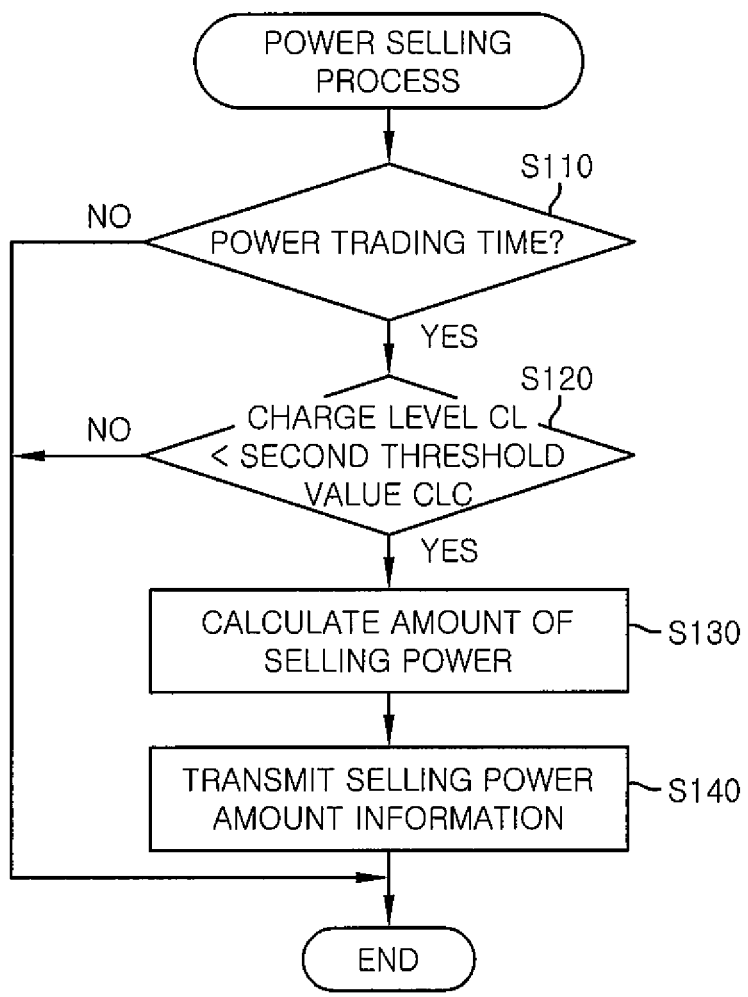
FIG. 4 is a flowchart of a power selling process which is executed by a power control unit in accordance with the embodiment of the present invention.

A selling process performed by the control unit 7 is described with reference to FIG. 4. In the selling process, the amount of selling power is calculated by the control unit 7, and the power is sold to other power consumers 60. This process is repeated at every predetermined period of calculation.

In step S110, it is determined whether a current processing time is a preset trading time. For example, for a power consumer 60 where an electric power is generated by the solar cell 3, the time at which the charge level CL of the battery 16 is expected to be maximum is set as the preset trading time and the power consumer 60 is notified of the preset trading time in advance. When the trading time is arrived, the process proceeds to step S120.

In step S120, it is determined whether the charge level CL has exceeded the second threshold value CLC. When the charge level CL is lower than or equal to the second threshold value CLC, power selling is not conducted, and therefore the process is finished. When the charge level CL is higher than the second threshold value CLC, an amount of selling power is calculated in step S130. The amount of selling power may be calculated in a desired manner. For example, several tens to hundred percentages of the amount of charged power MG above the second threshold value CLC in the battery 16 may be set as the amount of selling power. Thereafter, in step S140, information on the amount of selling power is transmitted to the individual power consumers 60 via the network N.

Figure 5:
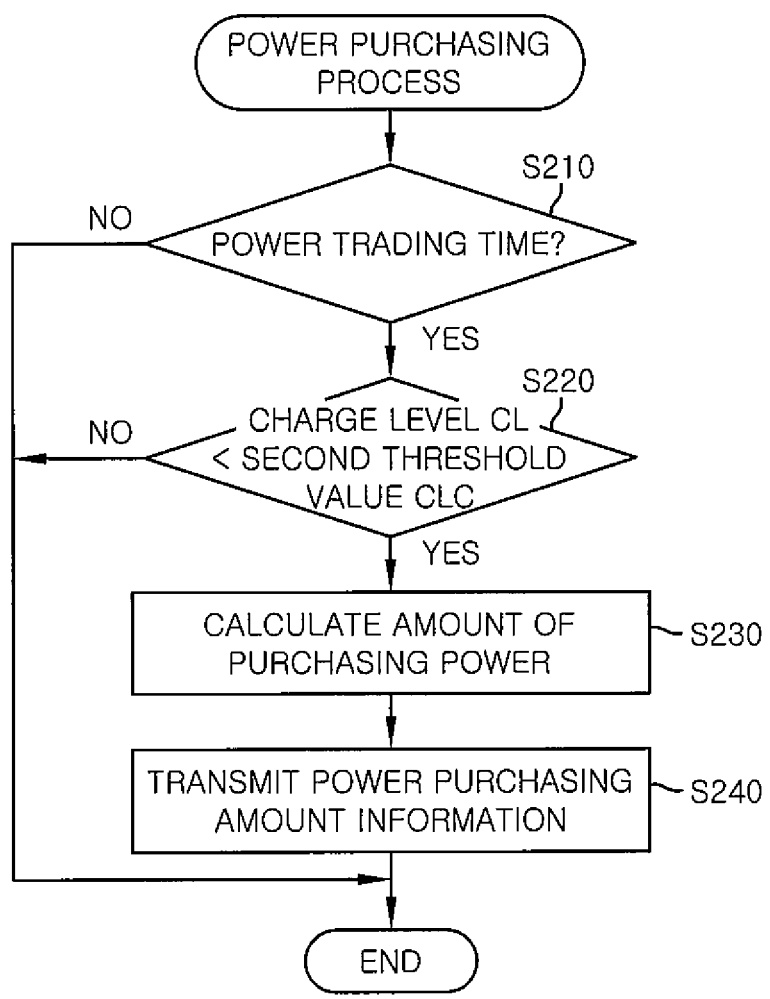
FIG. 5 is a flowchart showing a power purchasing process which is executed by the power control unit in accordance with the embodiment of the present invention.

Referring to FIG. 5, in a purchasing process which is performed by the control units 7 of the power consumers B and C, an amount of purchasing power is calculated by the control unit 7. This process is repeated at every predetermined period of calculation.

In step S210, it is determined whether a current processing time is a preset trading time. When the trading time is arrived, the process proceeds to step S220. In step S220, it is determined whether the charge level CL of the battery 16 is lower than or equal to the second threshold value CLC.

If the determination result is YES in step S220, the amount of purchasing power calculated in step S230. The amount of purchasing may be defined as, e.g., the difference between the full charge level CLA and the charge level CL at the processing time. Thereafter, in step S240, information on the amount of purchasing power is transmitted to the individual power consumers 60 via the network N.

Figure 6:
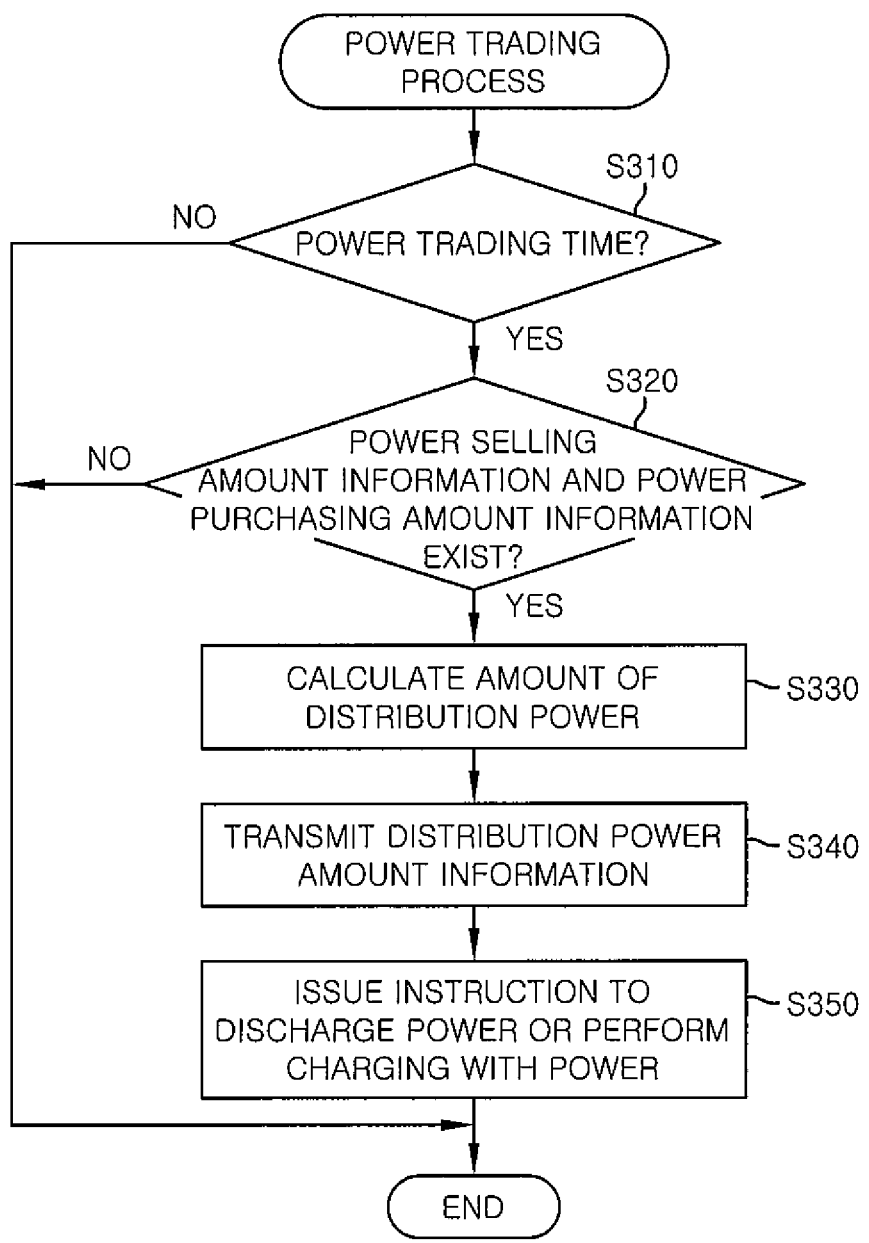
FIG. 6 is a flowchart showing a power trading process which is executed by the power controller unit in accordance with the embodiment of the present invention.

A power trading process which is performed by the power control unit 7 will now be described with reference to FIG. 6.

In this power trading process which is described below, the control unit 7 compares the amount of selling power with the amount of purchasing power and establishes the power trade. This process is repeated at every predetermined period of calculation.

In step S310, it is determined whether a current processing time is a preset trading time. If the trading is arrived, the process proceeds to step S320. In step S320, it is determined whether both information on the amount of selling power and information on the amount of purchasing power are available. If there is only one piece of information, the power trade cannot be established, and therefore the process is finished.

When the determination result is YES in step S320, the amount of distribution power ME which is used to distribute the amount of selling power to one or more purchasers is calculated in step S330. For example, when there is one purchaser and the amount of selling power is equal to or larger than the amount of purchasing power, the amount of distribution power ME is equal to the amount of purchasing power. When there is one purchaser and the amount of selling power is smaller than the amount of purchasing power, the amount of distribution power ME is equal to the amount of selling power. When there are two or more purchasers, the amount of selling power is distributed in the ratio between the amounts of purchasing powers. For example, as shown in FIG. 3, "48" of the distribution power is allotted to the power consumer B and "32" of the distribution power is allotted to the power consumer C.

Thereafter, in step S340, distribution power amount information indicating the amount of the distribution power ME is transmitted to the individual power consumers 60 via the network N. In step S350, the control unit 7 of the power consumer 60 as a seller issues an instruction to discharge a power from the battery 16. Meanwhile, at this time, the control unit 7 of the power consumer 60 as a purchaser issues an instruction to charge the battery 16 with the power. In this case, the amount of the power flowing through the power lines 113 increases and at the same time the amount of the power flows into the battery 16 of the power consumer 60 as the purchaser. Further, as described above, during the discharging process based on the power trade, when there is a reverse flow of a current, the power trade is invalidated, the power discharging on a seller side and the power charging into the battery 16 on a purchaser side are stopped.

Referring to FIGS. 7A to 7D, power trading is described by comparing variations in the charge level CL of the battery 16 of each power consumer 60 before the execution of a power trade with variations in the charge level CL of the battery 16 of each power consumer 60 after the execution of the power trade. The drawing qualitatively shows an example of the variations in charge level CL which occurs over a day when power has only been generated by the solar cells 3 in a specific environment.

Figure 7A:
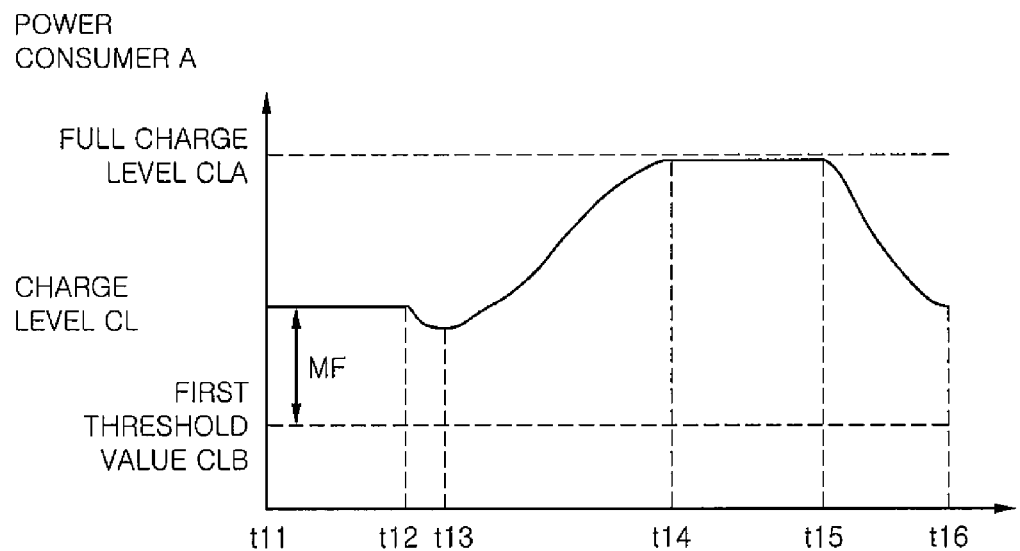
Figure 7B:
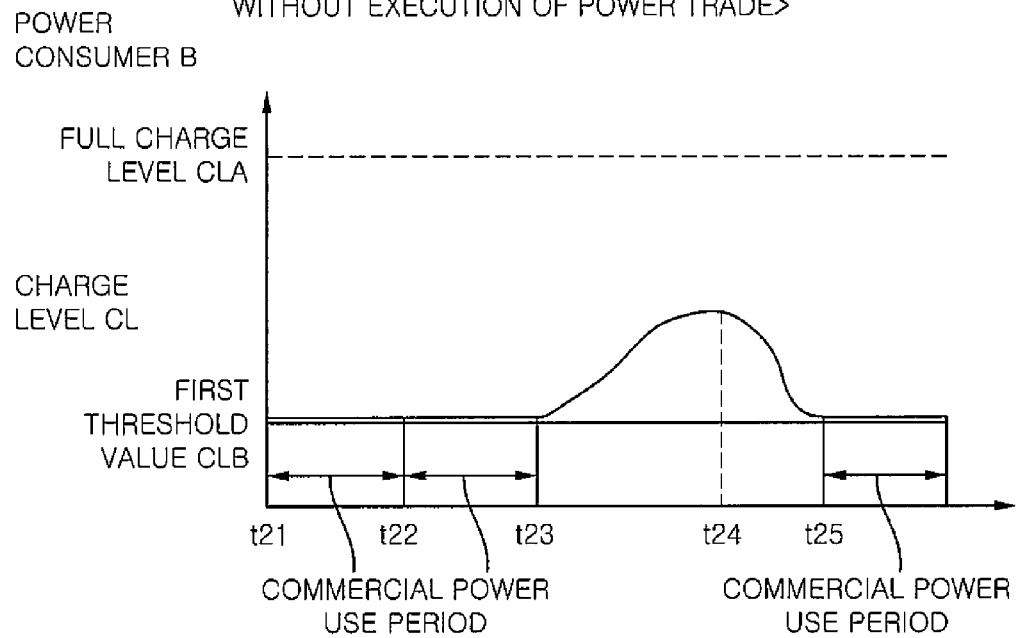
Figure 7C:
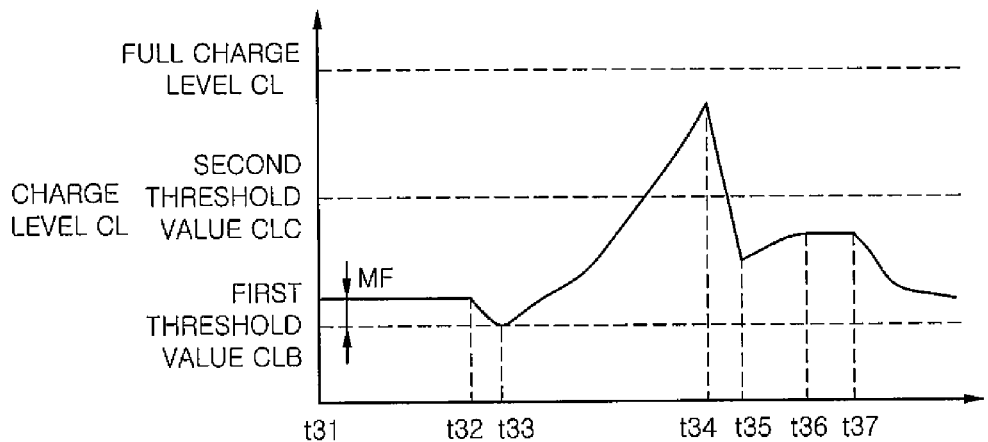
Figure 7D:
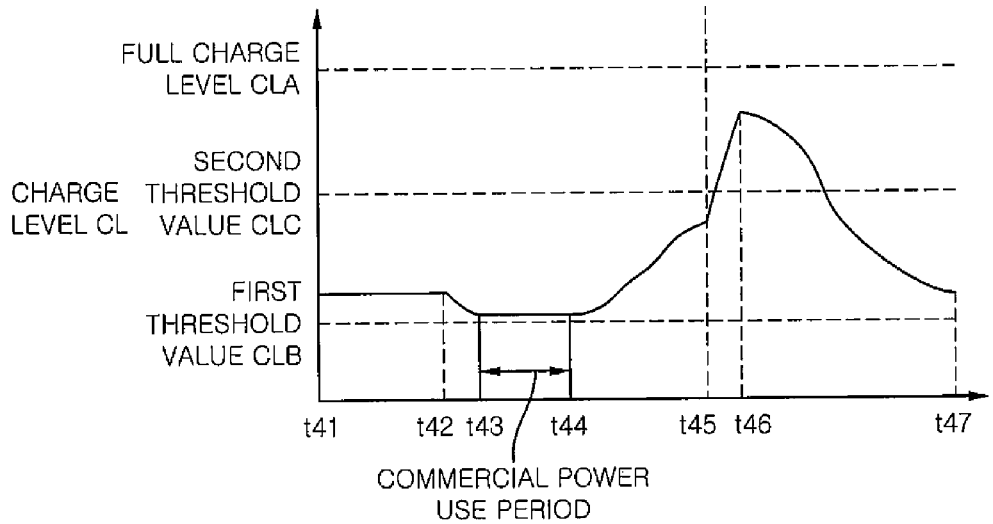

FIGS. 7A and 7B show variations in the charge level CL of the battery 16 of each power consumer 60 before the execution of a power trade. FIGS. 7C and 7D show variations in the charge level CL of the battery 16 of each power consumer 60 after the execution of the power trade. FIG. 7A shows variations in the charge level CL of the battery 16 in a power consumer 60 which consumes some of a power generated by the solar cell 3 during the daytime, within a day. For example, a power consumer A which has a small number of family members corresponds to the case of FIG. 7A.

Time t11 corresponds to midnight. At time t11, the charge level CL is higher than the first threshold value CLB. That is, a part of the amount of power accumulated during the daytime is not consumed and is left over as the amount of surplus power MF.

Time t12 is a waking up time. At time t12, the use of the AC appliance 6 and the DC appliances 5 is started and the charge level CL starts to drop. Since the number of family members of the power consumer A is small, the extent of the decrease in the charge level CL is also small.

At time t13, the charge level CL stops dropping. In the case of the power consumer A, from time t13, the amount of power generated by the solar cell 3 becomes larger than the amount of consumed power MD consumed by the AC appliance 6 and the DC appliances 5 and the amount of charged power gradually increases. For this reason, the charge level CL gradually rises.

At time t14, the charge level CL reaches the full charge level CLA. At this time, the charging of the battery 16 is restrained. For this reason, the amount of power generated by the solar cells 3 is no longer accumulated. That is, during the period from time t14 till sunset, a power generated by the solar cells 3 is discarded.

At time t15, the use of the AC appliance 6 or DC appliance 5 of the power consumer A is started. At time t15, the charge level CL starts to fall. At time t16, the use of the AC appliance 6 or DC appliance 5 is stopped. As shown in the drawing, a part of the power generated by the solar cell 3 and accumulated during the daytime is not consumed and is left over.

FIG. 7B shows variations in the charge level CL of the battery 16 in a power consumer 60 which exhausts a power, generated by the solar cells 3 during the daytime, during a day and is supplied with power from the commercial AC power source 2. For example, a power consumer B having a large number of family members corresponds to the case of FIG. 7B.

At time t21, the charge level CL is equal to the level of the first threshold value CLB. That is, the power accumulated during the daytime has been completely consumed. The amount of consumed power MD by the AC appliance 6 which operates at midnight is met by the power from the commercial AC power source 2.

Time t22 is waking up time. At time t22, the use of the AC appliance 6 and the DC appliances 5 is started. The amount of consumed power MD during this time span is fed with the power from the commercial AC power source 2. In the drawing, the period over which the amount of consumed power MD is fed with the power of the commercial AC power source 2 is presented as the commercial power use period.

At time t23, the amount of power generated by the solar cell 3 becomes larger than the amount of consumed power MD consumed by the power consumer B. At time t23, the charging of the battery 16 is initiated. In the drawing, the extent of the rise in the charge level CL is lower than that of power consumer A. This indicates that in the case of power consumer B, the AC appliance 6 and the DC appliances 5 are used during the daytime.

At time t24, the amount of power generated by the solar cell 3 becomes smaller than the amount of consumed power MD consumed by the power consumer B. At time t24, the charge level CL starts to fall. The falling extent gradually increases. At time t25, the charge level CL reaches the first threshold value CLB, and the power discharging from the battery 16 is restrained. From time t25, the amount of consumed power MD consumed by the AC appliance 6 or DC appliance 5 is fed with the power of the commercial AC power source 2.

FIG. 7C shows variations in the charge level CL of the battery 16 in the power consumer A when a power trade is executed.

Time t31 is midnight. At time t31, the charge level CL is higher than the first threshold value CLB. That is, a part of the amount of the power accumulated during the daytime is not consumed and is left over as the amount of surplus power MF. The amount of surplus power MF is smaller than the amount of surplus power MF shown in FIG. 7A.

Time t32 is wakeup time. At time t32, the use of the AC appliance 6 and the DC appliances 5 is started, and the charge level CL starts to fall. At time t33, the charge level CL starts to rise. In the case of the power consumer A, from time t33, the amount of power generated by the solar cell 3 becomes larger than the amount of consumed power MD consumed by the AC appliance 6 and the DC appliances 5 and thus the amount of charged power gradually increases. For this reason, the charge level CL gradually increases.

Time t34 is the time at which a power trade is executed. At this time, a power starts to be discharged from the battery 16 via the power lines 113, and at time t35, the amount of selling power is completely discharged, and then power discharging is stopped. Further, at the time, charging with a power generated by the solar cell 3 is initiated.

Time t36 is sunset at which a power is not generated by the solar cell 3 anymore. From time t36, the charge level CL does not rise. Further, from time t37, the charge level CL gradually falls because the AC appliance 6 or DC appliance 5 start to be used.

In this example, the power accumulated in the battery 16 is sold, and therefore the charge level CL reaching the full charge level CLA is avoided. Accordingly, since the time period during which a power generated by solar cell 3 is discarded as in FIG. 7A does not exist, a power generated by the solar cell 3 is not discarded and is accumulated in the battery 16.

FIG. 7D shows variations in the charge level CL of the battery 16 of the power consumer B over the time period during which a power trade is executed.

Time t41 is midnight. At time t41, the charge level CL is higher than the first threshold value CLB. That is, a part of the amount of the power accumulated during the daytime is not consumed and is left over as the amount of surplus power MF.

Time t42 is wakeup time. At time t42, the use of the AC appliance 6 and the DC appliances 5 is started. For this reason, the charge level CL gradually falls, and the charge level CL reaches the first threshold value CLB at time t43. From time t43, the amount of consumed power MD is satisfied by the power from the commercial AC power source 2.

At time t44, the charge level CL starts to rise. In the case of the power consumer B, from time t44, the amount of the power generated by the solar cell 3 becomes larger than the amount of power MD consumed by the AC appliance 6 and the DC appliances 5. For this reason, the charge level CL gradually increases.

Time t45 is the time at which a power trade is executed. That is, at time t45, a power trade is executed between the power consumer A of which the charge level CL is higher than the second threshold value CLC and the power consumer B of which the charge level CL is lower than the second threshold value CLC. At this time, charging with the power from the power supply system 110 is initiated, and the charging of the power purchased is completed at time t46.

From time t46, the charge level CL gradually falls because a power is supplied from the battery 16 to the AC appliance 6 and the DC appliances 5. At time t47, the use of the AC appliance 6 and the DC appliances 5 stops, and the falling of the charge level CL stops.

In this example, since a power is purchased via the power lines 113 in conformity with the selling of the power by the power consumer A, this case can increase the charge level CL of the power consumer B compared to the case where such purchasing of the power is not performed. Accordingly, the period during which the AC power from the commercial AC power source 2 is used is reduced.

The power trading system 100 in accordance with the present embodiment has the following advantages.

(1) In the present embodiment, the power interchanging group G having, as its members, the power consumers 60 which interchanges a power therebetween is formed. Each power consumer 60 of the power interchanging group G includes the control unit 7 for managing the power from the power generation device. The control unit 7 transmits to and receives from the other power consumers in the power interchanging group G the selling power amount information presenting the amount of the selling power and the purchasing power amount information presenting the amount of the purchasing power. Further, the control unit 7 establishes a power trade between the power consumers 60 based on the selling power amount information and the purchasing power amount information and issues an instruction to discharge the amount of selling power of the power consumer 60 on a selling side to the power supply system 110 based on the conditions of the power trade made between the power consumer 60 on the selling side and the power consumer 60 on a purchasing side.

In the configuration, the power consumers 60 share the power selling amount information and the power purchasing amount information within the power interchanging group G and also trade an electric power therebetween by using the control units 7. Since the power trade is executed by the control units 7 provided in the respective power consumers 60, a power can be traded between the power consumers 60 without the intervention of a management device which collectively manages the power consumers 60.

(2) Each of the power consumers 60 includes the battery 16 for storing a generated power.

When the charge level CL of the battery 16 exceeds the second threshold value CLC, the amount of selling power is obtained based on the amount of power above the second threshold value CLC.

With this configuration, a power generated by the power generation device is accumulated in the battery 16 first to be sold, and the battery 16 functions as a buffer, so that power can be stably traded with the other power consumers 60.

(3) In the present embodiment, the electricity meter 120 for measuring the amount of a power flowing through the base portion is provided in the corresponding base portion of the power supply system 110, the base portion being provided at upstream of the junction portion branching into the individual power consumers 60. When a reverse flow of a current is detected by the electricity meter 120, a power trading by the control unit 7 is restrained.

With this configuration, when a reverse flow of the current occurs in the base portion provided at upstream of the power lines 113 which supplies a power to the respective power consumers 60, a power is supplied to the outside beyond the range of the power trading within the whole power interchanging group G. In the present invention, when a reverse flow of a current is detected by the electricity meter 120, the power trading of the control units 7 are restrained, thereby being able to suppress the reverse flow of a current.

Other Embodiments

The embodiment of the present invention is not limited to the above-described embodiment, but the embodiment may be varied or modified, e.g., as described below. Further, the following variations are not only based on the above-described embodiment, but are configured by combining other variations.

In the above-described embodiment, although the control units 7 execute power trades upon matching up trade counterparts based on the information of the table in FIG. 3, a seller, one or more purchasers and a trading condition (preset power trading condition) may be set in advance and power trades may be automatically executed in the preset power trading condition.

In this case, the control units 7 are provided with the function of setting power trading condition between specific power consumers 60 in advance. The control units 7 execute power trades based on the preset power trading condition. When a power to be sold is generated, a power trade can be executed based on the preset power trading condition without establishing a power trade between a seller and a purchaser, so that demands for a power can be rapidly satisfied.

In the above embodiment of present invention, although the power trades involving amount of charged power MG from the power generation of the solar cells 3 have been described with reference to FIGS. 7A to 7D, the execution of the power trades according to the present invention may be applied regardless of the type of power generation device which is the source of the power stored in the battery 16.

In the above embodiment of present invention, although a power is discharged from the battery 16 when a power trade enters into an agreement, the discharging of the power is not limited to the power discharge from the battery 16. For example, when a power trade enters into an agreement, the power generated by the solar cell 3 may be discharged to the power supply system 110. With this configuration, when a surplus power is generated because the amount of photovoltaic power MA is larger than the amount of consumed power MD, the surplus power can be immediately traded with other power consumers, and therefore the demands for power can be satisfied rapidly.

In the above embodiment of present invention, although a power trade is prevented between the subsidiary power line 112 to which the power consumers 60 of the power interchanging group G are connected and some other subsidiary power line 112 by providing the electricity meter 120 at the upstream of the power supply system 110, the electricity meter 120 may be omitted.

In the above embodiment of present invention, although the power consumers 60 having the power generation devices are the members of the power interchanging group G, a power consumer having no power generation device may be a member of the power interchanging group G. In this case, the corresponding power consumer 60 participates in the power trade as a purchaser.

In the above embodiment of present invention, although the power consumers 60 target general dwellings, the power consumers 60 are not limited to dwellings. The power consumers 60 may be buildings, facilities or the like which is supplied with a power from a single power supply system 110, such as schools, hospitals, or factories.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A power interchange system for enabling a plurality of power consuming units, which are supplied with a power from a power supply system, to interchange a power generated by their power generation devices among themselves, wherein each of the power consuming units comprises a power control device which transmits and receives power selling amount information indicating an amount of a selling power and power purchasing amount information indicating an amount of a purchasing power to and from the other power consuming units, trades a power with one or more power consuming units based on the power selling amount information and the power purchasing amount information and issues an instruction to discharge a power corresponding to the amount of the selling power to the power supply system based on a power trading condition, wherein:

the plurality of the power consuming units form a power interchanging group;

the power control device of each power consuming unit manages the power from the power generation device in the corresponding power consuming unit, transmits and receives the power selling amount information and the power purchasing amount information to and from the other power consuming units in the power interchanging group, establishes a power trade between two or more of the power consuming units based on the power selling amount information and the power purchasing amount information, and issues an instruction to discharge a power corresponding to the amount of the selling power to the power supply system based on the power trading condition that have been made between the corresponding power consuming unit which sells the power and the one or more power consuming units which purchase the power;

each of the power consuming units further comprises a battery for storing the power generated by the power generation device;

when a charge level of the battery exceeds a first threshold value, each of the power consuming units determines the amount of the selling power based on an amount of a power stored in the battery above the first threshold value;

when the charge level of the battery is lower than a second threshold value, each of the power consuming units determines the amount of the purchasing power based on an amount of a power corresponding to a shortage to reach the second threshold value.

2. The power interchange system of claim 1, wherein the power control device has a function of setting a power trading condition between specific power consuming units in advance, and executes a power trade between the specific power consuming units based on the set power trading condition.

3. The power interchange system of claim 1, wherein the amount of the selling power is a difference between an amount of the power generated by the power generation device and an amount of a power consumed by the corresponding power consuming unit when the amount of the generated power is larger than the amount of the consumed power.

4. The power interchange system of claim 1, wherein an electricity meter for measuring an amount of a power flowing through a base portion is provided in the base portion of the power supply system, the base portion being provided at upstream of a power supply junction branching into the individual power consuming units, and the power trade by the power control device is restrained when a reverse flow of a current is detected by the electricity meter.

5. The power interchange system of claim 1, wherein the power consuming units correspond to dwellings.

6. The power interchange system of claim 1, wherein the power consuming units correspond to dwellings that generate electric power by themselves in addition to power supplied from a commercial AC power source.

7. The power interchange system of claim 1, wherein the power consuming units correspond to dwellings and each of the dwellings first ensures an amount of power required by the dwelling and then interchanges any remaining power with other dwellings.

8. The power interchange system of claim 1, wherein the power consuming units correspond to dwellings that form part of a power interchanging group that trade power with each other.

9. The power interchange system of claim 1, wherein when the charge level of the battery reaches a third threshold value, a power discharge from the battery is restrained to preserve an electric power for emergency, the first threshold value is greater than the third threshold value, and the first threshold value is equal to the second threshold value.

10. The power interchange system of claim 1, wherein when two or more power consuming units require purchasing powers, the selling power is distributed thereamong in a ratio of amounts of the purchasing powers required by the two or more power consuming units.

\* \* \* \* \*